(12) United States Patent
Behrens et al.

(10) Patent No.: US 9,569,971 B2
(45) Date of Patent: Feb. 14, 2017

(54) SATELLITE COMMUNICATION NETWORK

(75) Inventors: Jorg Behrens, Bremen (DE); Klaus Werner, Schwulper (DE); Lars-Christian Hauer, Bremen (DE); Toni Delovski, Bremen (DE)

(73) Assignee: Deutsches Zentrum fuer Luft—und Raumfahrt e.V., Cologne (DE)

( * ) Notice: Subject to any disclaimer, the term of this patent is extended or adjusted under 35 U.S.C. 154(b) by 381 days.

(21) Appl. No.: 14/004,428

(22) PCT Filed: Mar. 9, 2012

(86) PCT No.: PCT/EP2012/054114
§ 371 (c)(1),
(2), (4) Date: Sep. 11, 2013

(87) PCT Pub. No.: WO2012/123360
PCT Pub. Date: Sep. 20, 2012

(65) Prior Publication Data
US 2014/0002293 A1   Jan. 2, 2014

(30) Foreign Application Priority Data
Mar. 11, 2011   (DE) .................. 10 2011 013 717

(51) Int. Cl.
*G08G 5/00* (2006.01)
*H04B 7/204* (2006.01)
(Continued)

(52) U.S. Cl.
CPC ............ *G08G 5/0013* (2013.01); *H01Q 1/125* (2013.01); *H04B 7/18508* (2013.01); *H04B 7/2041* (2013.01)

(58) Field of Classification Search
CPC ............ G08G 5/0004–5/0013; H04B 7/18508; H04B 7/2041; H01Q 1/125
See application file for complete search history.

(56) References Cited

U.S. PATENT DOCUMENTS 4,188,578 A * 2/1980 Reudink ............. H04B 7/2046
342/353
4,236,161 A * 11/1980 Ohm ................... H01Q 19/192
342/352
(Continued)

FOREIGN PATENT DOCUMENTS

| DE | 10 2005 031439 A1 | 1/2007 |
| DE | 10 2008 026415 A1 | 12/2009 |
| WO | 2009/112112 A1 | 9/2009 |

*Primary Examiner* — Matthew M Barker
(74) *Attorney, Agent, or Firm* — Whitham, Curtis & Cook, P.C.

(57) ABSTRACT

The invention relates to a monitoring system for the air-traffic control of flight objects (5, 6), which have transmitting units for emitting air-traffic control radio signals (ADS-B), wherein the air-traffic control radio signals (ADS-B) containing flight data concerning the respective aircraft (5, 6), the monitoring system comprising a plurality of receiving units (4a to 4c), which are designed to receive the emitted air-traffic control radio signals, wherein a plurality of satellites (1a to 1c) are provided, which each have communication means for forming a common satellite communication network and on each of which at least one of the receiving units (4a to 4c) is arranged, wherein the receiving units (4a to 4c) are connected to the communication means of the respective satellite (1a to 1c) and are designed to transmit the flight data contained in the air-traffic control radio signals to at least one ground station (3, 7) having a communication connection to the satellite communication network using a common communication protocol of the satellite communication network.

10 Claims, 2 Drawing Sheets

(51) Int. Cl.
   *H01Q 1/12*   (2006.01)
   *H04B 7/185*  (2006.01)

(56) References Cited

U.S. PATENT DOCUMENTS

| | | | | |
|---|---|---|---|---|
| 4,315,262 A * | 2/1982 | Acampora | ........... | H04B 7/2041 342/352 |
| 4,359,733 A * | 11/1982 | O'Neill | ........... | G01S 5/14 342/357.31 |
| 5,099,245 A * | 3/1992 | Sagey | ........... | G01S 5/06 342/357.2 |
| 5,619,211 A * | 4/1997 | Horkin | ........... | H04B 7/18508 342/352 |
| 5,969,674 A * | 10/1999 | von der Embse | ........... | G01S 13/003 342/357.2 |
| 6,173,178 B1 * | 1/2001 | Hammill | ........... | H04B 7/2041 455/12.1 |
| 6,175,719 B1 * | 1/2001 | Sarraf | ........... | H04B 7/2041 455/13.1 |
| 6,336,030 B2 * | 1/2002 | Houston | ........... | 455/12.1 |
| 6,374,104 B1 * | 4/2002 | Croq | ........... | H04B 7/2041 455/12.1 |
| 6,377,208 B2 * | 4/2002 | Chang | ........... | G01S 5/0054 342/357.43 |
| 6,456,846 B2 * | 9/2002 | Norin | ........... | H04B 7/2041 342/352 |
| 6,563,457 B2 * | 5/2003 | Chang | ........... | G01S 5/0054 342/353 |
| 6,704,544 B1 * | 3/2004 | Sarraf | ........... | H04B 7/2041 455/13.1 |
| 7,570,214 B2 * | 8/2009 | Smith | ........... | G01S 5/0027 342/451 |
| 8,072,382 B2 * | 12/2011 | Smith | ........... | G01S 5/0027 342/357.31 |
| 8,344,945 B2 * | 1/2013 | Craig | ........... | H01Q 1/288 342/354 |
| 8,442,518 B2 * | 5/2013 | Ilarregui | ........... | H04B 7/18508 455/430 |
| 2004/0092257 A1 * | 5/2004 | Chung | ........... | H04B 7/2041 455/429 |
| 2011/0015852 A1 * | 1/2011 | Blomenhofer | ........... | G08G 5/0013 701/120 |

\* cited by examiner

SATELLITE COMMUNICATION NETWORK

FIELD OF THE INVENTION

The invention relates to a monitoring system for the air-traffic control of flying objects which have transmitting units for transmitting air-traffic control radio signals, wherein the air-traffic control radio signals contain flight data relating to the respective aircraft, with a plurality of receiving units which are designed to receive the transmitted air-traffic control radio signals, wherein a plurality of satellites are provided which in each case have communication means for forming a common satellite communication network and on each of which at least one of the receiving units is arranged. The invention also relates to a method and a use of a satellite communication network of this type for this purpose.

BACKGROUND

The monitoring and control of the air traffic which is constantly increasing worldwide is currently based primarily on two fundamental technologies: radar monitoring and voice-based VHF radio systems for Air Traffic Management (ATM). In the case of radar monitoring, radio signals are transmitted using special radar ground stations, said radio signals then either being reflected by the flying object on its outer surface and received once more by the ground station (primary radar) or causing the flying object autonomously to send back specific information to the ground station (secondary radar). However, in both cases it is necessary for the flying object to be located within a coverage area dependent on the range of the radar ground station, as no usable signals would otherwise be produced. Since radar ground stations of this type are very expensive to set up and are therefore also usually found only in regions with dense traffic or near the coast, gapless radar monitoring of flying objects is not currently provided.

If a flying object is located outside the radar coverage, the corresponding monitoring and control stations responsible for the air-traffic control of the corresponding flying object maintain contact at regular intervals via the VHF radio system. However, the VHF radio system is based entirely on the principle of voice messages, so that it often occurs in the case of long-haul flights that the corresponding monitoring and control station receives no information from the aircraft over a lengthy period because, for example, the autopilot is activated and the pilots are asleep. The status of the flying object is therefore uncertain over a lengthy period and is not therefore suitable for a continuous gapless monitoring.

ADS ("Automatic Dependent Surveillance") systems are known in addition to the primary and secondary radar already mentioned. In ADS systems, corresponding data are automatically and continuously collected on board the aircraft, including the current position, which can be determined, for example, using a satellite navigation system. Other flight data may, for example, be the flight number, aircraft type, speed, flight altitude and planned flight direction. If a corresponding radio signal transmitted from a ground station is received by the flying object, the flying object transmits these flight data using a corresponding ADS message to the ground station. The ground station receives the message and can display the flight data contained in the message to the air-traffic controllers or control stations. These systems, which transmit the messages on request, are also frequently referred to as ADS-C or ADS-A. For this purpose, the aircraft are equipped with so-called FANS-1/A devices, which enable a radio data link via VHF, RF or satellite radio and therefore also a monitoring of the aircraft in oceanic airspace. However, the position messages are transmitted at time intervals of around 15 minutes or more due to the low data rate, so that a continuous flight monitoring is not provided.

Along with the systems which transmit their flight data entirely on request, the ADS-B (Broadcast) system also exists, which autonomously transmits a corresponding ADS message at periodic, discrete-time intervals of around half a second. If the flying object is located in a region with dense traffic, an entire range of ground stations is normally located here, which can receive the automatically transmitted ADS message. In addition, it is also possible for other flying objects which have a corresponding receiver to be able to receive ADS-B messages from other aircraft, in order thus to build up a picture of the traffic situation of the surrounding airspace depending on the flight data contained in the message.

Since the equipment of transport aircraft with mode-S transponders is currently prescribed as mandatory, the mode-S 1090ES data transmission system has become established as the de facto standard for the ADS-B system in general aviation. Mode-S 1090ES is based on the modulation methods and data formats defined for mode-S, wherein a fixed, worldwide unique 24-bit address is allocated to each aircraft. The downlink in mode-S is established at a frequency of 1090 MHz.

However, as with all systems based on radio location, the ADS systems have the decisive disadvantage that the aircraft must be located in the receiving area of a corresponding receiving unit so that the ADS messages transmitted by the aircraft can also be received by the corresponding supervisory control station. Due to the limited range of the ADS-B signals, a worldwide gapless monitoring using ground stations is not possible even with a system of this type since, on the one hand for cost reasons, and, on the other hand due to geographical conditions, ground stations cannot be set up all over the world for gapless coverage.

In order to guarantee a reception of ADS signals even in areas in which no coverage is guaranteed by corresponding ground stations, DE 10 2008 026 415 A1 and DE 10 2008 013 357 A1, for example, propose that the ADS-B signals transmitted by a flying object can be received by a satellite correspondingly suited for this purpose. The messages can then be forwarded from there to a ground station or can be transmitted to a relay satellite in order to achieve a greater transmission path. Due to the fact that a satellite monitors the ADS-B signals regularly transmitted by the aircraft, a partial monitoring can be carried out precisely in areas where no coverage with ground stations is possible.

However it is disadvantageous here that the use of relay satellites for range extension is very costly, since the operators of relay satellites of this type levy a charge for the use thereof. In addition, a ground station must be able to communicate with a multiplicity of different satellite types in order to be able to receive corresponding ADS messages in practice also.

SUMMARY

The object of the present invention is therefore to indicate a method and a system with which a worldwide, gapless monitoring of air traffic is possible, but which can be set up simply and cost-effectively.

The object is achieved according to the invention with the monitoring system of the aforementioned type in that the receiving units are connected to the communication means of the respective satellite and are configured to transmit the flight data contained in the air-traffic control radio signals to at least one ground station having a communication link to the satellite communication network using a common communication protocol of the satellite communication network.

The air-traffic control radio signals may be the ADS-B messages transmitted by the mode-S transponders on board the aircraft.

It is therefore proposed according to the invention that receiving units which can receive the air-traffic control radio signals are integrated into the structure of a satellite communication network in such a way that the common communication protocol of the satellite communication network can be used to transmit the flight data contained in the radio signals. Due to the satellite configuration, a worldwide encompassing satellite communication network is formed, the communication protocol of which can be used for the transmission to the ground station. The ground station itself can similarly make use of the standardized communication protocol to communicate with the satellite communication network, so that a corresponding communication device can be designed here also in a simplified manner.

Through the use of the common communication protocol of the satellite communication network, an ADS-B message received by the receiving units and the flight data contained therein can be transmitted from any location to any other location in the world. Since the use of relay satellites can be dispensed with, this system therefore also meets the real-time requirements of ATM/ATC systems. The flight data transmitted by the aircraft can therefore be transmitted in a fraction of a second to the corresponding control stations. Furthermore, however, no further modifications are required in the aircraft themselves, since transport aircraft are currently equipped as standard with mode-S transponders which are configured to transmit ADS-B signals as air-traffic control radio signals.

In order to implement a gapless receiving area by means of the satellite communication network and the receiving units arranged thereon, it is advantageous if the individual receiving areas overlap in their peripheral areas with adjacent receiving areas, so that a reception can always be ensured. It is then quite particularly advantageous here if air-traffic control radio signals received multiple times and their flight data contained therein are transmitted once only to the ground station in order to avoid a corresponding traffic overhead in the satellite communication network. Air-traffic control radio signals received multiple times are radio signals which are transmitted by an aircraft once within an overlap area and are received by the respective adjacent receiving units.

Air-traffic control radio signals received multiple times can be identified, for example, depending on the address or the position of the aircraft and the known orbit and therefore also the position of the satellites. However, it is also conceivable that, following reception of a radio signal, the receiving unit interrogates receiving units on adjacent satellites to ascertain whether they have also received a corresponding radio signal. Via the definition of a master and a slave, it can then be achieved that only the master transmits its data to the ground station, whereas the slaves reject their received data.

As already mentioned, the air-traffic control radio signals may be ADS-B messages transmitted by the mode-S transponders.

Furthermore, it is quite particularly advantageous if the receiving units are configured for the temporary storage of partial flight data. Flight data which change only very little or very slowly are often transmitted at a lower update rate via the ADS-B system than flight data which change very substantially over time. Thus, for example, the speed, altitude and flight direction change very little in a 3-second or 5-second period, whereas the current position changes very substantially within one second due to the flight speed. The less substantially changeable flight data are therefore transmitted at a lower update rate, and are then temporarily stored by the receiving units, whereas the substantially changeable flight data are transmitted at a very high update rate and are received by the receiving units. The flight data thus transmitted to the ground station then consist of the currently received flight data and the temporarily stored flight data, so that a full and complete flight data report can always be transmitted to the ground station, wherein the flight data are transmitted at the same update rate as the aircraft transmits the ADS-B signals.

Following the reception by the receiving unit, the flight data advantageously contain time information, which is also referred to as a timestamp, so that the exact time of the reception by the receiving unit on the satellite can thus be identified. The time information is provided either by the satellite itself or by the receiving unit, wherein the time information is determined depending on a time signal which is synchronized both with the satellite or the receiving unit and with the corresponding ground station. A satellite navigation system, for example, can supply a synchronized time signal of this type.

By means of the supplemented time information, the ground station can then establish how long the transmission path from the satellite which has received the actual ADS-B signals to the ground station has actually lasted, so that the up-to-date status of the flight data can also be displayed to the air-traffic controller. It is furthermore conceivable that flight data, the transmission time of which has exceeded a certain threshold, are rejected, since they no longer represent the current flight situation and can therefore negatively distort the traffic picture.

It is furthermore conceivable that the ground station, depending on the time information and the transmission duration determined therefrom, corrects the time-variable flight data depending on the transmission duration. It is thus possible, with knowledge of the speed and transmission duration, to extrapolate and therefore correct the position of the aircraft determined on board, taking account of the transmission time.

Furthermore, it is quite particularly advantageous if the receiving units are configured to predict position and/or movement information of the flight data depending on a future transmission time. Following reception of the air-traffic control radio signals, the receiving unit determines when the flight data contained in the radio signals are to be transmitted to the ground station using the satellite communication network. Depending on this future transmission time, the corresponding time-dependent flight data such as position and/or movement information are then calculated for the transmission time, so that the flight data according to the forecast are up-to-date at the actual transmission time.

Since a so-called pulse position modulation method is carried out in the case of the mode-S signals used for the ADS-B system, in which the bit information is defined on the basis of the position within the signal block, and the channel access method is randomized, signal collisions (garbling) frequently occur in regions with dense traffic, since many transmitters randomly transmit simultaneously or the signals may be superimposed on one another in the receiver due to different transit times. The receivers are then no longer able to separate the different signals from one another and decode them, so that, on the whole, they must be rejected.

For this purpose, it is thus quite particularly advantageous if the receiving units have a plurality of directional receive antennas with associated receivers and decoders to form sector-by-sector receiving areas in order thus to carry out the monitoring sector-by-sector within a receiving area defined by the orbit of the satellite. As a result, the probability of signal collisions is reduced due to the now smaller receiving area per receive antenna. Furthermore, it is thereby achieved that, if the satellite in its orbit enters regions with dense traffic, the areas still covering the low-traffic regions guarantee a sufficient reception, whereas the sector already located in the area with dense traffic is overloaded. However, the overload in areas with dense traffic may be non-critical, since the coverage is normally sufficiently guaranteed here through ground radar or ADS-B ground stations. Due to the sector-by-sector arrangement, it is thus at least achieved that a reliable reception still remains guaranteed in the low-traffic regions.

However, it is also conceivable that the sector-by-sector arrangement of directional receive antennas is implemented in an overlapping manner in such a way that at least one of the directional receive antennas can receive a corresponding signal even in regions with dense traffic due to the different signal transit times. Thus, a monitoring by means of the satellite communication network can then be carried out even in regions with dense traffic.

Moreover, it is quite particularly advantageous if the receiving units are configured with devices to track the directional receive antenna and/or to adapt the directional effect of the directional receive antennas depending on a traffic density. If, for example, the satellite in its orbit enters a region with dense traffic, the directional receive antenna of the sector which now projects into the area with dense traffic can be adapted in its directional effect in such a way that, for example, the sector is reduced. In order to then prevent any gaps, the adjacent sectors and their directional receive antennas can be adapted in such a way that their areas are increased, in order thus to guarantee a gapless receiving area. The problem of signal collision in the pulse position modulation method can thus be reduced due to the dynamic adaptation of the directional effect of the individual directional receive antennas.

However, it is also conceivable that the individual directional receive antennas are tracked or are pivoted by a corresponding pivoting device, in order thus to be able to cover the individual areas correspondingly and keep directional receive antennas out of regions with dense traffic.

The traffic density can be determined here, for example, depending on the satellite position in its orbit. Thus, it is generally known that a lower traffic density normally occurs over the oceans, whereas a very high traffic density can be expected at specific flight hubs, such as international airports. It is thus possible to establish on the basis of the position of the satellite whether the directional receive antennas project with their sector-by-sector receiving areas at least partially into regions with dense traffic.

Furthermore, the object is also achieved with the method for the worldwide air-traffic control of flying objects, with the following steps:

transmission of air-traffic control radio signals by means of transmitting units arranged on the flying objects, wherein the air-traffic control radio signals contain flight data relating to the respective aircraft, reception of the transmitted air-traffic control signals by receiving units arranged on satellites, wherein the satellites have communication means to form a common satellite communication network and the receiving units are connected to the communication means of the respective satellite, and transmission of the flight data contained in the air-traffic control radio signals to at least one ground station having a communication link to the satellite communication network using a common communication protocol of the satellite communication network.

Advantageous designs of the method can be found in the corresponding subclaims.

Furthermore, the object is furthermore also achieved through the use of a satellite communication network which is formed from a plurality of satellites, in each case with at least one receiving unit to receive traffic control radio signals in order to carry out the above method.

BRIEF DESCRIPTION OF THE DRAWING

The present invention is explained in detail by way of example with reference to the attached drawings, in which.

DETAILED DESCRIPTION

Figure 1:
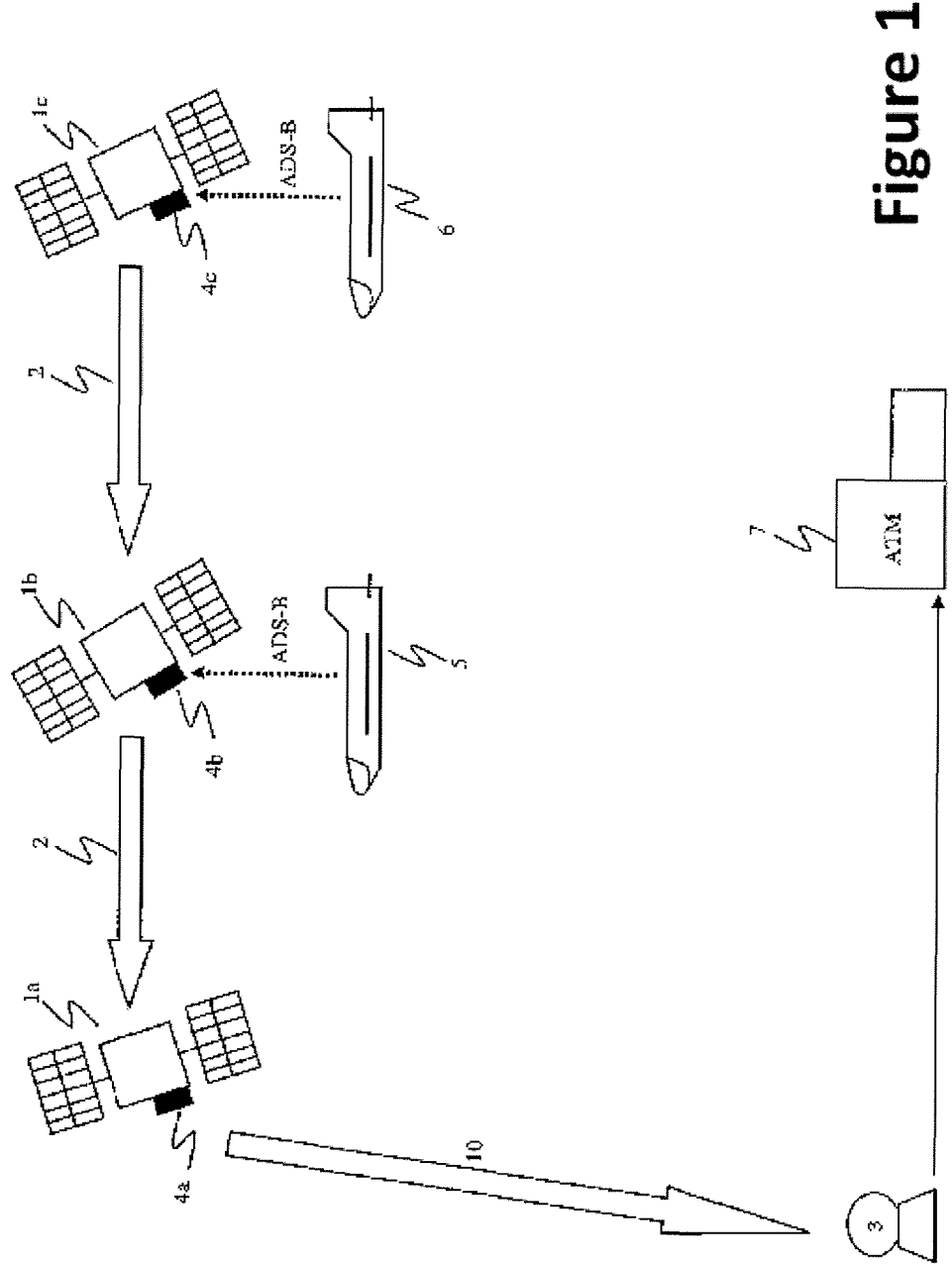
FIG. 1—shows a schematic representation of a monitoring system according to the present invention.

FIG. 1 shows a schematic representation of a monitoring system according to the present invention. For this purpose, a plurality of satellites $1a$ to $1c$ are located in a relatively low orbit, for example in the LEO (Low Earth Orbit), in which the flight altitude is between 200 km and 1,500 km. The satellites have corresponding communication means, so that they are reciprocally interconnected via a communication link 2 and form a common satellite communication network. Communication means of this type may be corresponding transmitters and receivers, which are configured to set up inter-satellite links.

Satellite communication networks are, for example, Iridium, Globalstar or Orbcom. Iridium is a satellite configuration with 66 LEO satellites, with which a worldwide and gapless telephone reception is intended to be guaranteed independently from any ground stations. The satellite communication network is designed to set up telephony and/or data connections.

Through the formation of a common communication network, the satellites $1a$ to $2c$ can transmit their data or messages to a central ground station 3, which is configured to communicate with the satellites $1a$ to $1c$. For the sake of clarity, the number of satellites is restricted to three in this example embodiment.

This satellite configuration $1a$ to $2c$, which forms a common satellite communication network via the communication links 2, has a corresponding receiving unit 4 on each satellite $1a$ to $1c$ which is configured to be able to receive corresponding mode-S signals which are transmitted by corresponding transponders on the aircraft 5 and 6. Thus, for example, the Iridium system, for a consideration, enables special units to be arranged on the satellite which are then connected to the equipment of the satellite and can use said equipment. The receiving units $4a$ to $4c$ arranged on the satellites $1a$ to $1c$ are thus integrated into the satellite communication network in such a way that they can also use the communication and network protocols used for the communication links 2 to transmit data, in order thus to be able to forward data to a ground station 3 of the satellite configuration.

In the example embodiment shown in FIG. 1, the aircraft 6 is located, for example, in the receiving area of the receiving unit 4c of the satellite 1c. The aircraft 6 transmits ADS-B signals at regular intervals, which are received by the receiving unit 4c of the satellite 1c. The flight data contained in the ADS-B radio signals are then decoded and transmitted via the communication link 2, said links forming the common communication network, to a further satellite 1b, which in turn transmits the data to the next satellite via the communication link 2, whereupon the data are then forwarded via a download link 10 to the ground station 3 of the communication network. From there, the flight data transmitted by the aircraft 6 are then forwarded to an air traffic management or air-traffic control center 7, which take over the air-traffic control in general.

The advantage here is that the individual ground stations 7 no longer have to communicate directly with the satellites, but with a central ground station 3, which has a communication link to the satellite communication network of the satellites 1a to 1c. The entire infrastructure required for the communication is made available here on the satellite side, so that, through the addition of receiving units into the communication network infrastructure of the satellites, the latter can also be used by the receiving units. A gapless coverage with ADS-B flight monitoring can thus be implemented at low cost, without special satellites, which only serve the purpose of receiving ADS-B signals, having to be built for this purpose and put into the orbit.

In the example embodiment shown in FIG. 1, a further aircraft 5 is located in the receiving area of the receiving unit 4b of the satellite 1b. These flight data received by the receiving unit 4b are also transmitted via a communication link 2 between the satellites to the satellite which ultimately forms the downlink to the base station of the satellite communication network. The ground station is connected here to an air-traffic control center 7 and forwards the flight data to the latter.

In order to achieve the highest possible update rate, for example in such a way that flight data are forwarded within seconds to the air-traffic control center 7, special flight data which are transmitted at substantially greater intervals by the aircraft are temporarily stored in the receiving units. The entire flight data report, which is then forwarded to the air-traffic control center 7, is then produced from the temporarily stored communications and the currently received data, so that the high update rate can be implemented in real time.

If, for example, a satellite communication network is used which is configured for telephony and data traffic, for example in the case of the Iridium system, the real-time capability of this system can be realized through the use of the communication network optimized for speed, representing a significant requirement in the practical implementation. It can thus be guaranteed that every flight data report arrives at the air-traffic control center 7 within a fixed, predefined time window, so that current data are always available in real time.

Figure 2:
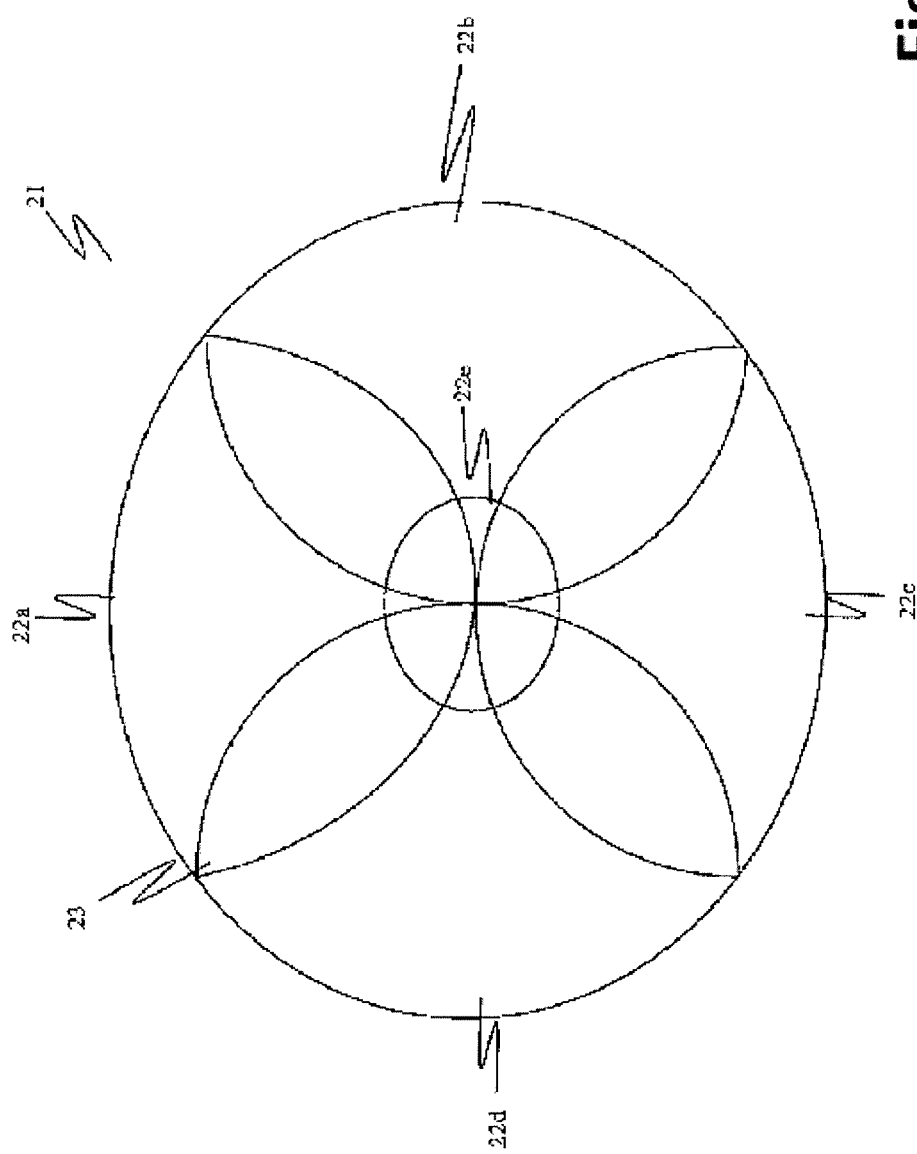
FIG. 2—shows a receiving area of a receiving unit with a plurality of sector-by-sector directional receive antennas.

FIG. 2 shows the receiving area 21 of a receiving unit which has a plurality of directional receive antennas and therefore covers the receiving area 21 sector-by-sector by means of the receiving sectors 22a to 22e. ADS-B radio signals are receivable by two or more sector antennas in the overlap areas 23.

Advantageously, the receiving unit is then designed in such a way that it can adapt the expansion of the sector receiving areas 22a to 22e depending on a traffic density. If, for example, the satellite in its orbit passes over an area with dense traffic, it first enters the area with dense traffic with the peripheral area of a sector. In the example shown in FIG. 2, it is assumed here that the receiving sector 22a first enters the area with dense traffic.

Due to the proprietary modulation method, signal interferences occur in regions with dense traffic, since the signals are frequently transmitted simultaneously and are therefore affected by interference. A reliable reception is then no longer possible. To restrict the problem, it is quite particularly advantageous if the sector receiving area 22a is reduced, while the adjacent sector receiving areas 22b to 22d are increased to a correspondingly proportional extent. As a result of the reduction in the sector receiving area 22a, it is achieved that the collisions now relate to a relatively small receiving area, whereas a normal reception remains possible in the other receiving areas due to the low traffic density. In areas with dense traffic, a signal interference is totally acceptable, since further backup systems usually exist here, such as, for example, ground radar or ground stations, which can similarly receive ADS-B signals.

It is also conceivable for the directional effect to be shifted in order to achieve that, for example, a sector is covered by two or more receiving areas. It is thus possible, in the example embodiment shown in FIG. 2, to shift the sector receiving area 22e in the direction of the sector receiving area 22a in order to ensure a reasonably interference-free operation due to the overlap of a plurality of receiving areas on the basis of the different signal transit times. For this purpose, the receiving units can, for example, be equipped with pivoting devices, which allow the directional receive antennas to pivot in the corresponding directions.

The invention claimed is:

1. A monitoring system for the air-traffic control of flying objects which have transmitting units for transmitting air-traffic control radio signals, wherein the air-traffic control radio signals contain flight data relating to the respective aircraft, the monitoring system comprising:
   a plurality of receiving units configured to receive the transmitted air-traffic control radio signals; and
   a plurality of satellites which in each case have communication means for forming a common satellite communication network and on each of which at least one of the receiving units is in each case arranged,
   wherein each receiving unit of the plurality of receiving units is connected to the communication means of the respective satellite,
   wherein the plurality of receiving units are configured to transmit the flight data contained in the air-traffic control radio signals to at least one ground station having a communication link to the satellite communication network using a common communication protocol of the satellite communication network,
   wherein the receiving units have a plurality of directional receive antennas to form sector-by-sector receiving areas with overlapping receiving areas of adjacent directional receive antennas, and
   wherein the receiving units are configured to predict position and movement information of the flight data depending on a future transmission time at which the receiving unit transmits the flight data to the ground station via the satellite communication network.

2. The monitoring system as claimed in claim 1, wherein the monitoring system is configured to identify air-traffic control radio signals received multiple times transmitted by a single transmitting unit and received by a plurality of receiving units in an overlapping receiving area and, on identifying air-traffic control radio signals received multiple times, is configured in such a way that the flight data contained in the air-traffic control radio signals are forwarded once only to the ground station.

3. The monitoring system as claimed in claim 1, wherein the receiving units are configured for the temporary storage of partial flight data, wherein the flight data transmitted to the ground station consist of currently received partial flight data and the temporarily stored partial flight data.

4. The monitoring system as claimed in claim 1, wherein the receiving units are configured to supplement the flight data with time information following the reception of the air-traffic control radio signals, wherein the time information is determined depending on a time signal synchronized with the ground station and the satellites.

5. The monitoring system as claimed in claim 1, wherein the receiving units are configured to perform one or more of tracking the directional receive antennas and adapting the directional effect of the directional receive antennas depending on a traffic density located in the receiving area.

6. A method for worldwide air-traffic control of flying objects, comprising:
   transmitting air-traffic control radio signals by transmitting units arranged on the flying objects, wherein the air-traffic control radio signals contain flight data relating to the respective aircraft,
   receiving the transmitted air-traffic control signals by receiving units arranged on satellites, wherein the satellites have communication means to form a common satellite communication network and each receiving unit is connected to the communication means of the respective satellite,
   transmitting the flight data contained in the air-traffic control radio signals to at least one ground station having a communication link to the satellite communication network using a common communication protocol of the satellite communication network,
   predicting, by one of the receiving units, one or more of the position and movement information of the flight data depending on a future transmission time at which the receiving unit transmits the flight data to the ground station via the satellite communication network, and
   one or more of
      tracking, by one or more of the receiving units, of a plurality of directional receive antennas per receiving unit to form sector-by-sector receiving areas with overlapping receiving areas of adjacent directional receive antennas, and
      adapting, by one or more of the receiving units, the directional effect of at least one directional receive antenna depending on a traffic density relating to at least one receiving area of the at least one directional receive antenna.

7. The method as claimed in the 6, further comprising identifying, by one of the receiving units, air-traffic control radio signals received multiple times transmitted by a single transmitting unit and received by a plurality of receiving units in an overlapping receiving area, and wherein the transmitting of the flight data contained in the air-traffic control radio signals to the ground station is performed in such a way that the flight data are forwarded once only to the ground station.

8. The method as claimed in claim 6, further comprising temporarily storing partial flight data by one of the receiving units and formation of the flight data to be transmitted to the ground station from the temporarily stored partial flight data and currently received partial flight data.

9. The method as claimed in claim 6, further comprising supplementing, by one of the receiving units, the flight data with time information following the reception of the air-traffic control radio signals by the receiving unit, wherein the time information is determined depending on a time signal synchronized with the ground station and the satellites.

10. The method as claimed in claim 6, further comprising determining, by one of the receiving units, a forecast traffic density depending on the current position of the satellite on which the receiving unit and the directional receive antennas are arranged.

\* \* \* \* \*